United States Patent [19]

Marcinkiewicz

[11] 4,244,213
[45] Jan. 13, 1981

[54] RETORQUE MEASURING APPARATUS

[75] Inventor: Eugene J. Marcinkiewicz, Plymouth, Mich.

[73] Assignee: GSE, Inc., Farmington Hills, Mich.

[21] Appl. No.: 20,610

[22] Filed: Mar. 15, 1979

[51] Int. Cl.³ .......................................... B25B 23/142
[52] U.S. Cl. ........................................ 73/139; 73/761
[58] Field of Search ................. 73/139, 761, 770, 847, 73/848

[56] References Cited

U.S. PATENT DOCUMENTS

| | | | |
|---|---|---|---|
| 2,888,825 | 6/1959 | Krafft | 73/139 |
| 3,995,477 | 12/1976 | Almond | 73/139 |
| 4,074,772 | 2/1978 | Jonsson | 73/770 |

FOREIGN PATENT DOCUMENTS 680311 10/1952 United Kingdom ...................... 73/770

*Primary Examiner*—Charles A. Ruehl
*Attorney, Agent, or Firm*—Krass and Young

[57] ABSTRACT

Apparatus for measuring the amount of previously applied torque to a fastener. A transducer is utilized to sense the amount of a subsequently applied torque to the fastener and provides an output signal representative of the applied torque. The torque is applied until further motion or breakaway of the fastener is obtained. Typically, the signal from the transducer increases until breakaway of the fastener is obtained and then the signal decreases momentarily to a valley before it again increases with further applied torque. A positive peak detector senses the maximum positive output of the transducer before the signal begins to decrease. A negative peak detector senses the minimum negative output of the transducer before the signal again increases. The negative peak detector is energized by a switching network upon detection of a negatively sloped signal from the transducer. A display coupled to the output of the negative peak detector provides a visual indication of the valley torque which is closely associated with the amount of torque originally applied to the fastener.

15 Claims, 7 Drawing Figures

RETORQUE MEASURING APPARATUS

BACKGROUND OF THE INVENTION

This invention relates to apparatus for measuring torque. More particularly, it involves apparatus for sensing the amount of previously applied torque to a fastener.

In a variety of manufacturing applications, it is imperative that the correct amount of torque be applied to a fastener. For example, in automotive applications, it is necessary to make sure that bolts have been tightened within a certain prescribed range of torque in order to properly fasten two parts together. It has been common procedure for a member of the quality control department to use a hand torque wrench to approximate the prior torque level by viewing the movement of the torque indicator just prior to the "give" or breakaway of the fastener. Later improvements of such a test included the use of a wrench which would maintain the position of the indicator at the maximum torque experienced.

Unfortunately, these prior art methods of sensing the applied torque were not very precise and not capable of being accurately reproduced from operator to operator. Even under ideal conditions the torque sensed was the "breakaway" torque which caused further relative movement of the fastener and not the torque delivered to the fastener in the first instance. Under true operating conditions even this breakaway torque could not be accurately sensed because the operator was not capable of instantaneously stopping the level of applied torque as soon as he noticed the fastener motion.

OBJECT AND SUMMARY OF THE INVENTION

Therefore, it is the primary object of this invention to provide an apparatus for accurately measuring the amount of previously applied torque to a fastener.

The present invention is based upon the discovery that the negative valley torque is a more accurate indication of the previously applied torque to the fastener. This negative valley torque is the minimum torque level which occurs immediately after the first positive peak or breakaway torque level and before the torque level begins to again increase with further applied torque. A transducer provides an output signal representative of the subsequently applied torque to the fastener which is applied until motion of the fastener is obtained. A positive peak detector senses the maximum positive output of the transducer before the signal decreases. A negative peak detector senses the minimum negative output signal of the transducer before the signal again increases. The negative peak detector is energized by a switching network upon detection of the negatively sloped signal from the transducer. A display device is utilized to provide a visual indication of the output of the negative peak detector thereby providing a measurement which is more closely associated with the amount of torque originally applied to the fastener than previously known methods.

Other features of this invention include the provision for additionally displaying the first positive peak signal from the transducer representative of the breakaway torque and the maximum amount of torque applied during the entire retorquing operation. This latter indication insures that an excessive amount of torque has not been applied during the test.

BRIEF DESCRIPTION OF THE DRAWINGS

These and other advantages of the present invention will become more apparent upon reading the following specification and by reference to the drawings in which.

DESCRIPTION OF THE PREFERRED EMBODIMENTS

Figure 1:
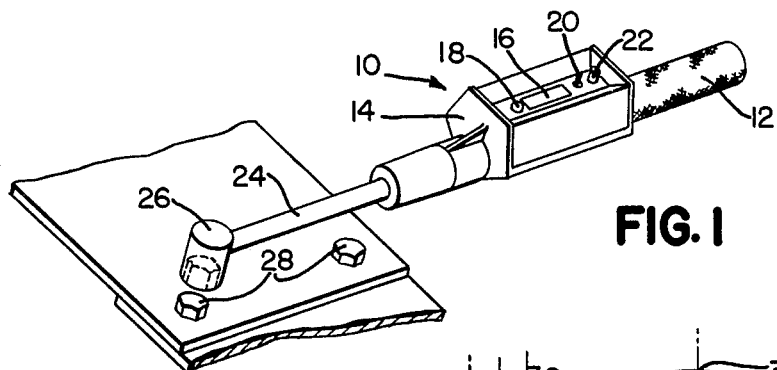
FIG. 1 is a perspective view showing the apparatus of the present invention in typical use.

FIG. 1 illustrates one example of a torque wrench testing apparatus which may incorporate the concepts of the present invention. Torque wrench 10 includes handle 12 on which housing 14 is mounted on intermediate portions thereof. Housing 14 includes an LED display 16 which is coupled to internally mounted circuitry which will be more fully described later in this description. Housing 14 includes an indicator lamp 18, a multi-position display selection switch 20, and a reset control switch 22. A shaft 24 attached to an opposite end of handle 12 includes a cylindrical head 26 at its free end. Head 26 includes suitable strain gages or other transducers therein for sensing the amount of torque applied by wrench 10. A more detailed description of a suitable transducer and torque wrench may be had by reference to U.S. Pat. No. 4,125,016 to Lehoczky et al issued Nov. 14, 1978, and assigned to the assignee of the present invention.

Figure 2:
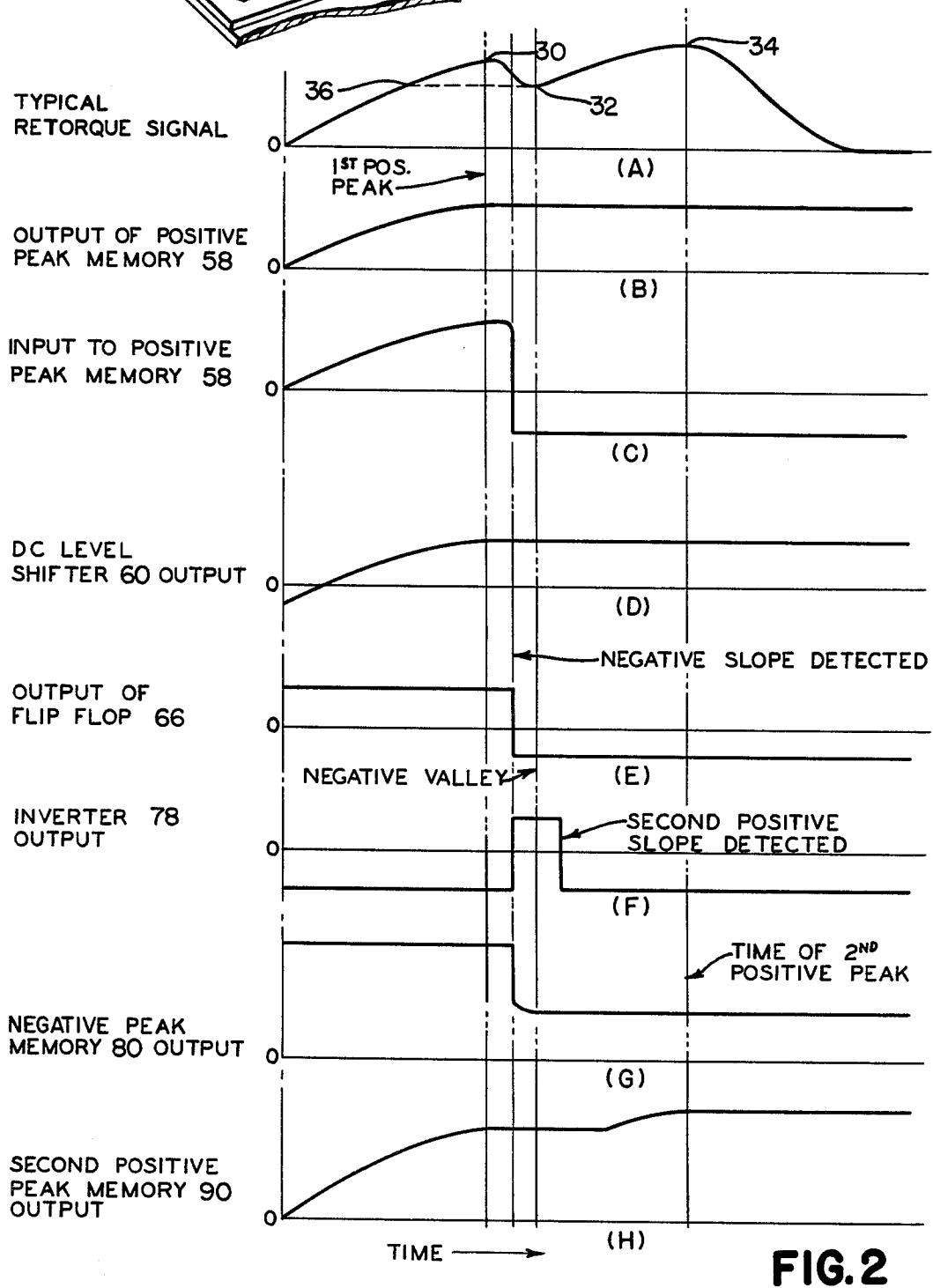
FIG. 2 (A-H) is a series of waveforms showing signals normally encountered in the circuitry of the present invention.

In a typical application of this apparatus, it is used to test the amount of previously applied torque to a fastener such as bolts 28. Head 26 of torque wrench 10 includes a suitable socket on its lower end for receiving the head of bolt 28. The wrench 10 is then rotated by the operator in the fastening direction until further rotational movement of bolt 28 is noted. This is commonly referred to in the industry as the "breakaway" of the fastener under test. FIG. 2A shows a typical torque level signal that may be encountered in this retorquing operation. The torque level increases with increasingly applied force by the operator until point 30 at which time the fastener begins further rotational movement. This point shall be referred to as the breakaway torque level. Immediately after the breakaway torque, the torque level sensed decreases to a minimum level 32. This point shall be referred to as the valley torque. It is not completely understood why the torque signal will decrease even though the operator is still applying force to the wrench 10. However, it is believed that this momentary decrease is due to the frictional forces being overcome between the bearing surfaces of the fastener and the fastened part. After a short period of time, the torque signal again increases to a maximum level 34 until the operator ceases to apply any more force to wrench 10. The maximum level 34 will, of course, depend upon how soon the operator ceases applying further torque after noticing the motion of the fastener.

Accordingly, there are three torque levels of interest; namely, the breakaway torque 30, the valley torque 32, and the maximum torque 34. It is important to realize that the valley torque level 32 has been discovered to be a more accurate indication of the originally applied torque to the fastener. This level is shown in FIG. 2A as point 36. Thus, it can be readily appreciated that previous methods of detecting either torque levels 30 or 34 did not provide an accurate indication of the previously applied torque to the fastener. Instead, all that can be ascertained from such a measurement is that at least a certain prescribed force has been applied, but even this was hard to consistently verify due to the inherent operator error factor. In constrast, the apparatus of the present invention provides a capability of sensing all three torque levels.

Figure 3:
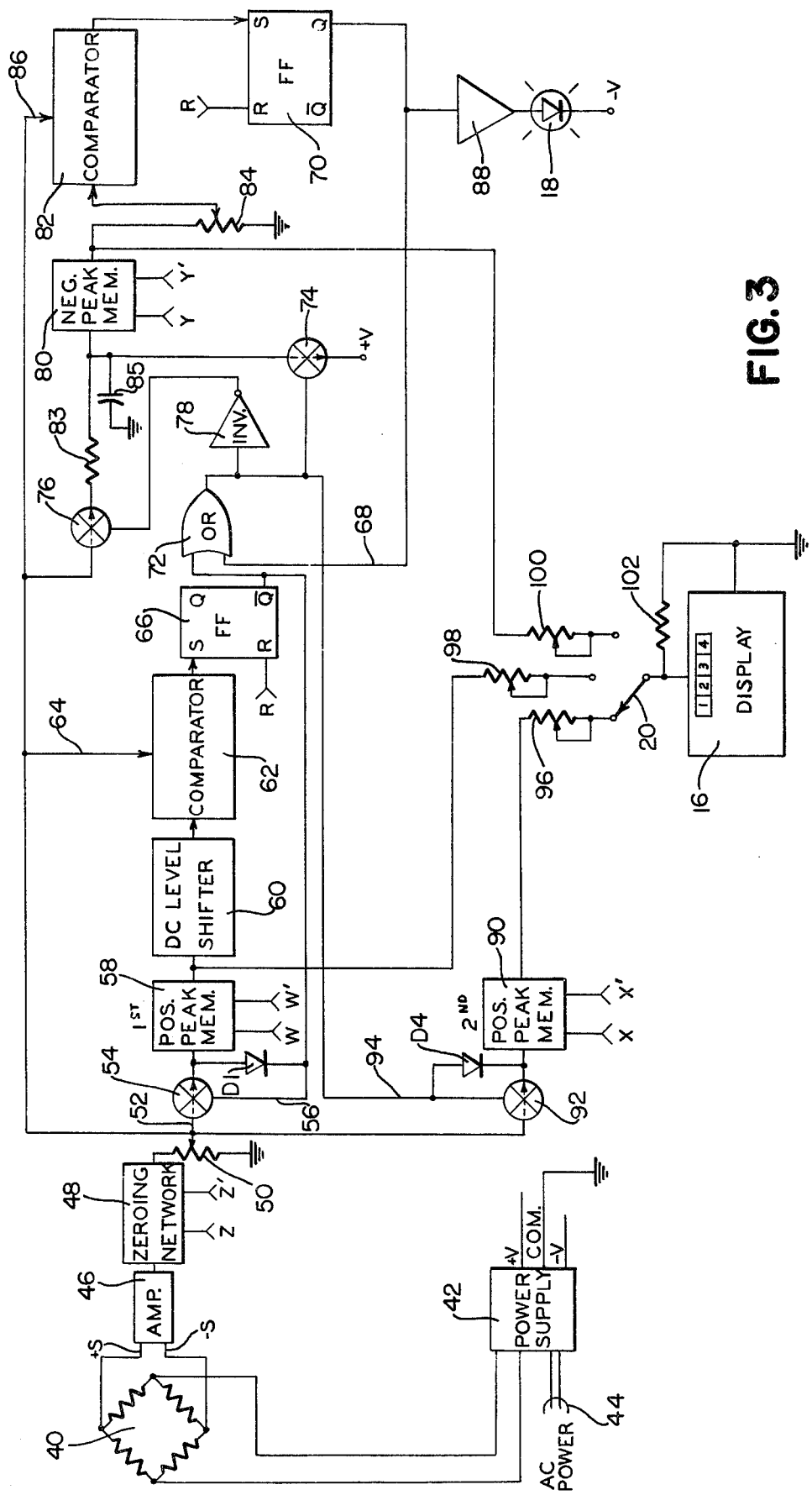
FIG. 3 is a block diagram of the electrical circuitry of the present invention.

FIG. 3 shows a functional block diagram of the circuitry of the present invention. A strain gage torque transducer 40 is powered by a regulated power supply 42 which supplies the necessary voltage levels to other portions of the circuitry as well. Plug 44 introduces on line power to the power supply 42. Transducer 40 can be a variety of suitable transducers for sensing the amount of applied torque. In this embodiment, strain gages in torque wrench head 26 are connected into a bridge network which provides a differential signal to amplifier 46 representative of the applied torque.

A zeroing network 48 is provided to adjust the output of amplifier 46 to a zero level when no torque is being applied by wrench 10. Zeroing network 48 may similarly take a multiplicity of forms such as a manually zeroing potentiometer, semi-automatic zeroing by the pushing of a button switch, or even via a timing circuit based upon prior conditions when the apparatus is used in an automated machine environment. A properly amplified and zeroed signal from transducer 40 is entered into a scaling potentiometer 50.

The conditioned transducer output signal is then split into five paths, all of which are coupled to node 52. The first path is into a semiconductor switching device 54 controlled by signals on control line 56. With a positive voltage or high signal on control line 56, device 54 conducts and passes signals from node 52 to an input terminal of a positive peak memory 58. The purpose of peak memory 58 is to store the breakaway torque level 30 shown in FIG. 2A. A simple peak detection device could not differentiate between the breakaway torque signal 30 and the maximum torque level 34. Accordingly, provision is made for detecting a negative going torque signal and turning off or de-energizing switch 54. A representative example of an input signal to memory 58 is shown in FIG. 2C and its output is shown in FIG. 2B.

The output of memory 58 is coupled to a DC level shifter 60. The output of DC level shifter 60 is coupled to a comparator 62 which compares the virgin torque signal on line 64 coupled to node 52 with the adjusted signal from shifter 60. As shown in FIG. 2D, the shifter 60 provides a negative offset with respect to the peak memory 58 output signal. Without the DC level shifting circuit 60, both inputs to comparator 62 would be the same, thereby resulting in an indeterminate condition for comparator 62. While this latter problem could be solved by reducing (attenuating) one of the signals to the comparator 62 via a simple voltage dividing network, such a solution may make the comparator sensitive to the level at which the slope reversal of the transducer signal takes place. On the other hand, the DC level shifter 60 provides a constant shift of the transducer signal to establish the level of offset required to circumvent inherent noise excursions of the signal and yet allow sensing of slope reversal at the earliest possible moment. By comparing FIGS. 2A to 2D, it can be seen that as long as the torque signal is increasing, the signal inputs to comparator 62 will be unequal. However, when the torque signal begins to decrease, the inputs to comparator 62 will become equal at the certain point determined by the level of offset. When coincidence is detected by comparator 62, it provides an output signal to the set input of an RS flip-flop 66 indicating detection of a negatively sloped transducer signal. At the beginning of the retorquing process, flip-flop 66 is reset via switch 22 thereby resulting in a positive voltage level on control line 56 for coupling transducer signals to peak memory 58. However, when flip-flop 66 is set, control line 56 goes low, thus opening switch 54 and preventing any subsequent storage of positive torque in peak memory 58. Accordingly, the output of positive peak memory 58 can be coupled to display device 16 via switch 20 to display the breakaway torque level.

Focusing attention now on the detection of the valley torque 32, control line 68 has been in a low state due to the initial reset of flip-flop 70 during the beginning of the retorquing process in the same manner as flip-flop 66. After the Q output of flip-flop 66 goes low upon detection of a negative going transducer output signal, the output of OR gate 72 goes low. The low output signal from OR gate 72 is coupled to semiconductor switch 74 and to semiconductor switch 76 through inverter 78. Inverter 78 produces a high signal for switch 76 which turns it on and allows the transducer signal to enter the negative peak memory circuit 80 upon detection of a negatively sloped transducer signal. FIG. 2F shows the output signal of inverter 78. Conversely, switch 74 assumes a non-conductive state. The purpose of switch 74 is to initially set the input to negative peak memory 80 at a preselected positive voltage level during the reset of the circuit at the beginning of the test. When terminals Y and Y' are shorted at reset, the input to negative peak detector 80 will be brought to a voltage level of about $+V$ through switch 74 which is conducting at that time. Resistor 83 and capacitor 85 filter some of the switching transients when switch 76 is first turned on. FIG. 2G shows the output of negative peak memory 80. The value of $+V$ is not particularly important as long as it is higher than the normally expected negative peak level. As should now be clear to one skilled in the art, the less positive transducer signal values cause the previously stored value to be successively reduced such that the final output of detector 80 is the least positive or most negative value detected when switch 76 is turned on. The minimum level of the torque signal or valley torque is thus stored in the negative peak memory 80 which, in turn, can be displayed on display 16 by moving switch 20 to the appropriate contact.

The output of negative peak memory 80 is coupled to one input of a comparator 82 through potentiometer 84. It should be noted that negatively sloped signal values are stored in the memory 80 which will continue to store such signals until comparator 82 senses a positive slope on line 86 which is coupled to the virgin transducer output. Potentiometer 84 establishes the necessary offset similar to the DC level shifter 60. A constant offset which would be provided by such a DC level shifter would be advantageous, but it has been found to be an unnecessary expense and satisfactory results are obtainable by the use of a simple potentiometer. In this embodiment, the gain of memory 80 is adjusted so that its output is more positive with respect to the transducer signal on line 86 during its negatively sloping portion. When the transducer torque signal on line 86 begins to again increase, the signal on lines 86 and 84 become substantially equal thereby providing an output signal from comparator 82 which sets flip-flop 70. The high output signal on the Q terminal of flip-flop 70 activates indicator lamp 18 via amplifier 88 to provide a visual indication that the valley torque has been detected and that the operator should cease applying further torque. The high signal from flip-flop 70 is also coupled to the input of OR gate 72. Thus, the output of OR gate 72 goes high, thereby reversing the conductivity states of switches 74 and 76.

Of course, it is practically impossible for the operator to immediately stop supplying any further torque to wrench 10 when valley torque lamp 18 is activated. For whatever reasons, an excessive amount of torque may be ultimately applied to the fastener. According to another feature of this invention, the maximum positive force applied to the fastener throughout the entire span of operation is also detected and displayed. The transducer signal from node 52 is coupled to a second positive peak memory 90 which is substantially identical to positive peak memory 58. A semiconductor switch 92 is conducting during the entire testing operation except for the time at which the valley torque is being detected. The output of OR gate 72 is coupled to the control line 94 of switch 92 such that a low signal on line 94 will cause switch 92 to block the entry of the transducer signal to memory 90. It can be remembered that the only time that OR gate 72 has a low output signal is during the time of the negative slope of the transducer signal. Accordingly, memory 90 detects and stores the signal such as signal 34 which is representative of the maximum applied torque during the entire span of operation. The output of the second positive peak memory 90 is shown in FIG. 2H. The output of memory 90 is coupled to display 16 via switch 20 where a visual indication of its output can be displayed by the appropriate setting of switch 20.

Accordingly, it can be seen that the breakaway torque 30, the valley torque 32, and maximum torque 34 can each be selectively displayed. Trim potentiometers 96, 98, 100, and resistor 102 are used for scaling the signals to make them compatible with display 16 in a manner well-known in the art.

Figure 4A:
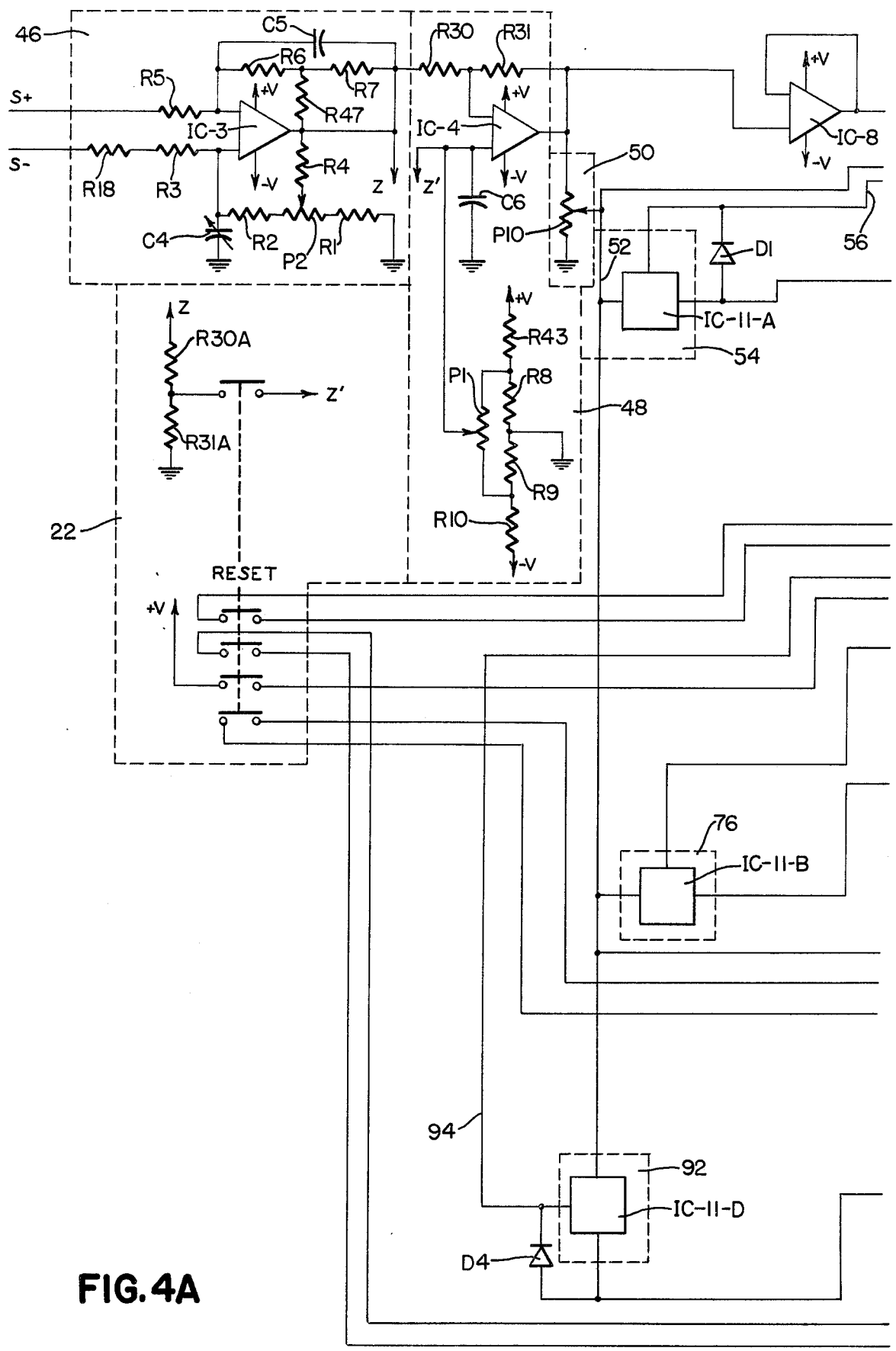
FIG. 4 (A-C) is a detailed schematic of the components shown in block diagram form in FIG. 3.
Figure 4B:
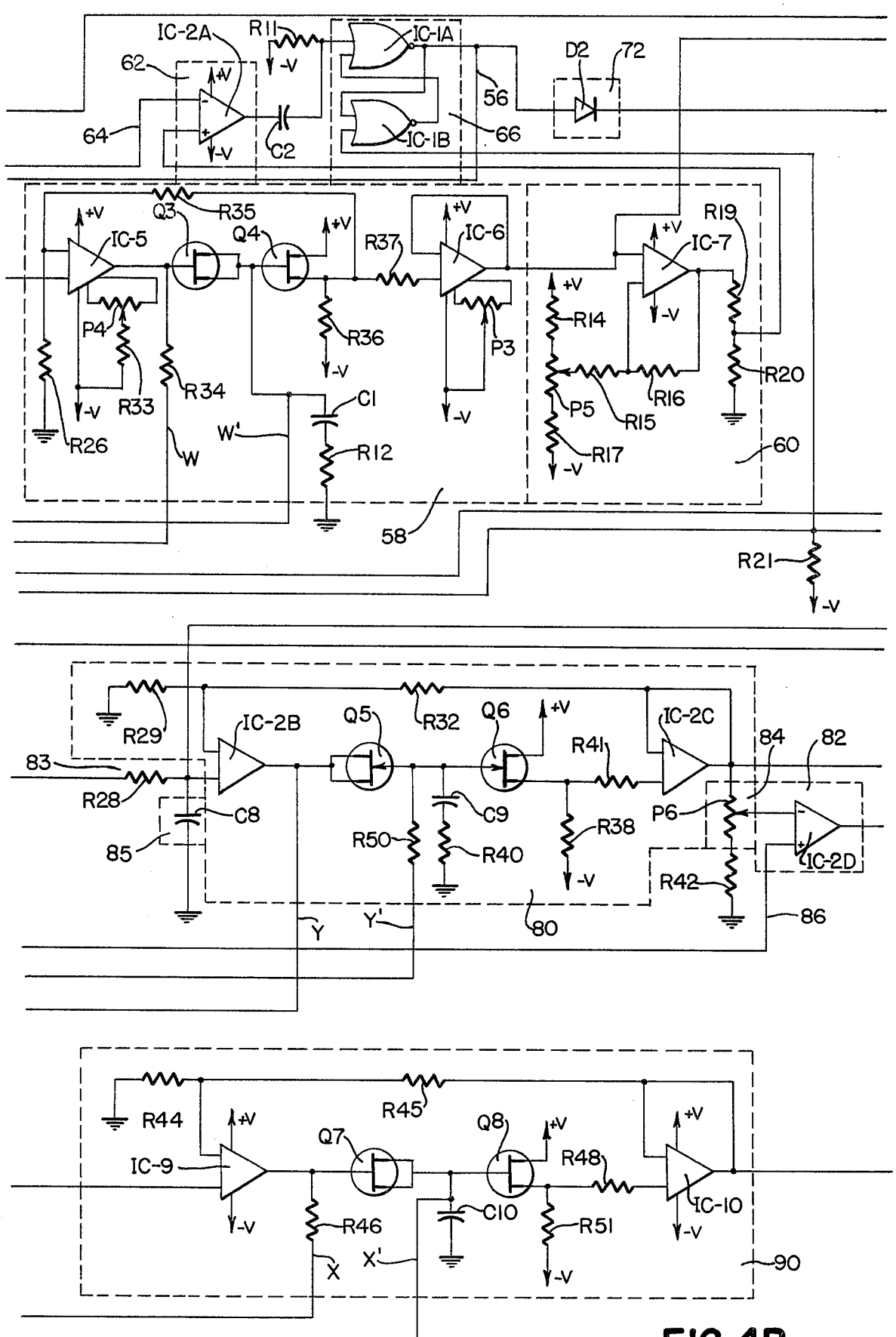
Figure 4C:
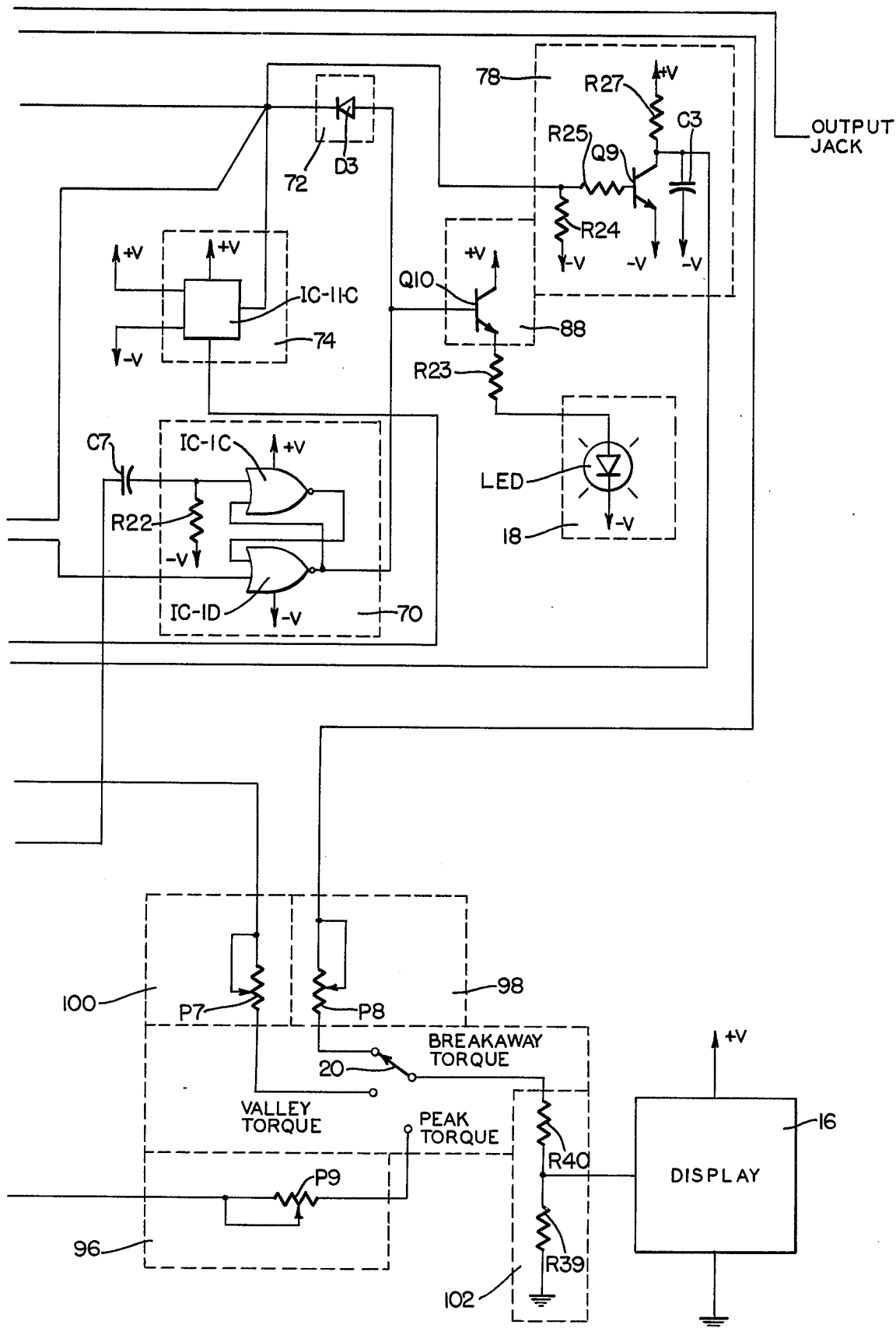

FIG. 4 shows the details of the functional blocks just described in connection with FIG. 3. The components making up these functional blocks are circumscribed by dotted lines in FIG. 4. Accordingly, it is believed that a detailed description describing the connection of each component would be superfluous and unnecessary for a person skilled in the art to construct the circuit disclosed in detail in FIG. 4.

Briefly amplifier 46 comprises operational amplifier IC3 and associated resistors to establish its gain as is well-known in the art. The output of amplifier 46 is coupled to zeroing network 48 in which the output thereof is regulated by potentiometer P1 to provide a zero output signal when the torque wrench is not being utilized. The first positive peak detector 58 employs a series of components IC5, Q3, Q4, and IC6 whose function is to store a charge on capacitor C1 representative of the first peak in the torque signal without letting the capacitor discharge on signals of lesser magnitude. The DC level shifter 60 employs integrated circuit IC7 whose output is regulated by the setting of potentiometer P5 to determine the level of offset. The non-inverting (+) input of comparator 62 is coupled to the output of level shifter 60 whereas the inverting (−) input is coupled to the transducer signal via node 52. When the signal from shifter 60 exceeds the transducer signal, it sets flip-flop 66 which is comprised of two cross-coupled NOR gates. OR gate 72 is comprised of two diodes D2 and D3 which control the activation of switches 74 and 76 comprised of integrated circuits IC-11C and IC-11B, respectively. Negative peak detector 80 employs a serial connection of components IC2B, transistors Q5 and Q6, and IC2C. When the device is first reset, capacitor C9 is charged to about +V. Upon receipt of less positive signals, the capacitor C9 discharges. Accordingly, capacitor C9 maintains the minimum negative output or valley torque signal 32. The inverting (−) input of comparator 82 is coupled to the output of negative peak memory 80 through potentiometer 84. The non-inverting (+) input is coupled to the transducer signal via node 52. The gain of the components making up negative peak detector 80 is set to a high level so as to provide a positive offset with respect to the transducer signal. Accordingly, when the transducer signal becomes more positive with respect to the negative peak signal comparator 82 will provide an output which is coupled to flip-flop 70 comprised of two cross-coupled NOR gates. An output from flip-flop 70 causes diode D3 to conduct thereby turning switch 92 back on to allow the second positive peak memory 90 to sense the maximum positive peak throughout the entire span of operation. The second positive peak memory 90 is substantially identical to the first positive peak memory 58. The output of the first positive peak memory 58, the negative peak memory 80, and second positive peak memory 90 are coupled to a three-position switch 20 through trim potentiometers 98, 100 and 96, respectively.

Accordingly, to utilize this device, power is applied to the device and the reset switch 22 is pushed thereby resetting the flip-flops and generally initializing the peak detector circuit components. The display 16 is then zeroed to provide a zero output. This can be accomplished by a variety of means and it is envisioned that an automatic zeroing network can be employed in an automated system. The torque wrench is then inserted over the fastener to be tested and rotated until the valley detection indicating lamp 18 is lit. Then, by the appropriate positioning of switch 20, the breakaway torque 30, the valley torque 32, and the maximum applied torque 34 throughout the entire operation can be selectively displayed.

The circuit components are preferably mounted and interconnected by printed circuit boards which are suitably mounted in housing 14. However, alternative embodiments, including fabrication of integrated circuit chips incorporating large blocks of the circuitry are also possible. Similarly, various types of displays may be utilized and, along with the associated circuitry, need not necessarily be mounted as an integral fixture on the torque wrench 10.

Figure 5:
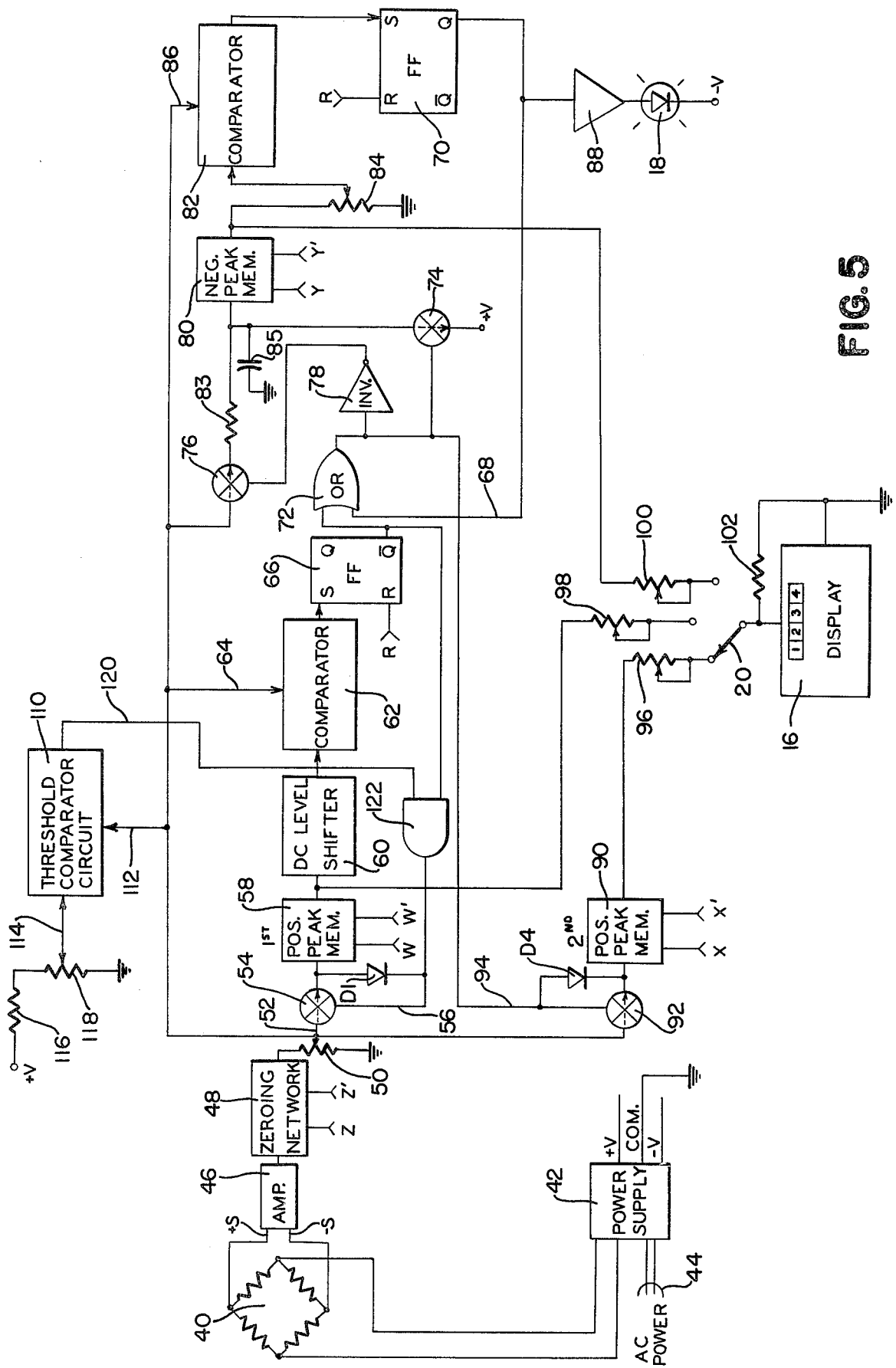
FIG. 5 is a block diagram along the lines of FIG. 3 which illustrates another feature of this invention.

FIG. 5 discloses another feature of this invention which automatically distinguishes those transducer output signals which are generated during the testing procedure and those which are not or merely preliminary to it. For example, during the insertion of torque wrench head 26 over bolt 28 the operator may accidentally be applying a small amount of torque to the fastener which may cause the test apparatus to believe this sensed torque was due to a bona fide test and thus provide an erroneous output.

To alleviate this possibility, threshold comparator circuit 110 is provided which compares the transducer signal on line 112 with a preselected voltage level supplied on line 114 by a voltage divider network comprised of resistor 116 and potentiometer 118 coupled to a voltage supply +V. Potentiometer 118 is adjusted to provide a voltage level which is greater than the transducer output signal that may be generated under preliminary set up or other non-test conditions. By way of a simplified example, assume that the fastener under test is supposed to be torqued to 100 ft/lbs and that the transducer signal at this torque level would be about 10 volts. Thus, a transducer signal of at least 5 volts certainly would be encountered during the testing procedure since the operator must apply at least 100 ft/lbs of torque to reach the breakaway level. On the other hand, a transducer signal of less than 5 volts may be generated during initial set up. Accordingly, the potentiometer 118 may be adjusted to provide voltage level on line 114 of 5 volts. Comparator 110 will thus provide an output on line 120 only when the transducer signal on line 112 exceeds this level.

The output of comparator 110 on line 120 and the $\overline{Q}$ output of flip-flop 66 are coupled to two inputs of AND gate 122, the output of which is connected to control line 56. It will be remembered that the $\overline{Q}$ output is at a HIGH level when the circuit is initially reset. However, control line will be LOW, thus turning off switch 54, until a HIGH signal is received on line 120 from comparator 110. Accordingly, the entire remaining circuit operation previously described is thus disabled until the transducer signal exceeds the preset threshold level thereby preventing erroneous readings which may be caused by extraneous factors not related to the testing operation.

The embodiments of the invention in which an exclusive property or privilege is claimed are defined as follows:

1. Apparatus for measuring the amount of previously applied torque to a fastener comprising:
   transducer means for providing an output signal representative of the amount of subsequently applied torque to the fastener, such torque being applied until motion of the fastener is obtained;
   first positive peak detector means for sensing the maximum positive output of said transducer before said signal decreases;
   negative peak detector means for sensing the minimum negative output signal of the transducer before said signal again increases;
   switching network means coupled to the output of said first positive peak detector for energizing said negative peak detector upon detection of a negatively sloped signal from the transducer; and
   display means for displaying the output of said negative peak detector, said output being closely associated with the amount of torque originally applied to the fastener.

2. The apparatus of claim 1 wherein said switching network includes:
   first comparator means for comparing the transducer signal with the output of said positive peak detector, said comparator providing an output signal when the output from the positive peak detector fails to track the transducer signal thereby indicating a negatively sloping transducer signal.

3. The apparatus of claim 2 wherein said switching network means further comprises a DC level shifter means coupled between the positive peak detector and said comparator for offsetting the signal from the positive peak detector from said transducer signal, with said comparator providing an output signal when said signals substantially coincide.

4. The apparatus of claim 2 which further comprises:
   first bistable means coupled to the output of the first comparator;
   a first switch means coupled between said transducer and the positive peak detector;
   second switch means coupled between said transducer and said negative peak detector;
   said first and second switch means being coupled to the output of said first bistable means wherein said first switch means is rendered non-conductive to block further transducer signals to the positive peak detector and rendering said second switch means conductive thereby energizing said negative peak detector upon detection of a negatively sloped transducer signal.

5. The apparatus of claim 4 which further comprises:
   third switch means coupled between a potential source and said negative peak detector, said third switch means applying an initialization potential to said negative peak detector; and
   said third switch means being coupled to the output of said first bistable means wherein said third switch means is rendered non-conductive upon detection of a negatively sloped transducer signal.

6. The apparatus of claim 4 which further comprises:
   second comparator means for comparing the output of said negative peak detector and said transducer signal, with said second comparator providing an output signal indicative of said transducer signal again increasing with a positive slope.

7. The apparatus of claim 6 which further comprises:
   offset means coupled between said negative peak detector and said second comparator for providing a positive offset with respect to said negatively sloped transducer signal such that said second comparator provides an output signal when the transducer signal and negative peak detector signal substantially coincide.

8. The apparatus of claim 7 which further comprises:
   second bistable means coupled to the output of said second comparator means, said second bistable means having an output coupled to said second switch means whereby said second switch means is rendered non-conductive upon detection of the transducer signal again positively increasing.

9. The apparatus of claim 1 which further comprises indicator means coupled to the output of said negative peak detector for providing a visual indication of the detection of the negatively sloped signal thereby signaling an operator to cease further torquing of the fastener.

10. The apparatus of claim 1 which further comprises:
    second positive peak detector means for sensing the maximum positive output of said transducer during the entire span of application of torque to the fastener.

11. The apparatus of claim 10 which further comprises:
    fourth switch means coupled between said transducer and said second positive peak detector; and means for coupling the output of said switching network to said fourth switch means for de-energizing said second positive peak detector upon detection of a negatively sloped signal from the transducer.

12. The apparatus of claim 10 which further comprises:
means for selectively displaying the output of said first positive peak detector, said negative peak detector, and said second positive peak detector.

13. The apparatus of claim 1 which further comprises:
discriminator means for preventing energization of said first positive peak detector until the transducer signal exceeds a predetermined level thereby eliminating detection of transducer signals not related to a bona fide test of the fastener.

14. The apparatus of claim 13 wherein said discriminator means comprises:
an adjustable voltage source;
threshold comparator means for comparing the transducer signal with the output of said voltage source, said comparator providing an output signal when said transducer signal exceeds the output of said adjustable voltage source; and
first switch means coupled between the transducer means and the first positive peak detector, said first switch means being rendered conductive upon receipt of the threshold comparator output signal to thereby couple the transducer signal to the first positive peak detector.

15. The apparatus of claim 14 which further comprises:
gating means having one input coupled to the threshold comparator output and another input coupled to an output of said switching network means, with the output of said gating means being coupled to said first switch means wherein the conductive states of said first switch means is dependent upon the output signals from said threshold comparator and said switching network means.

* * * * *